Aug. 23, 1927.
G. L. PITT
1,640,293
AUTOMOBILE JACK
Filed March 11, 1926  2 Sheets-Sheet 1
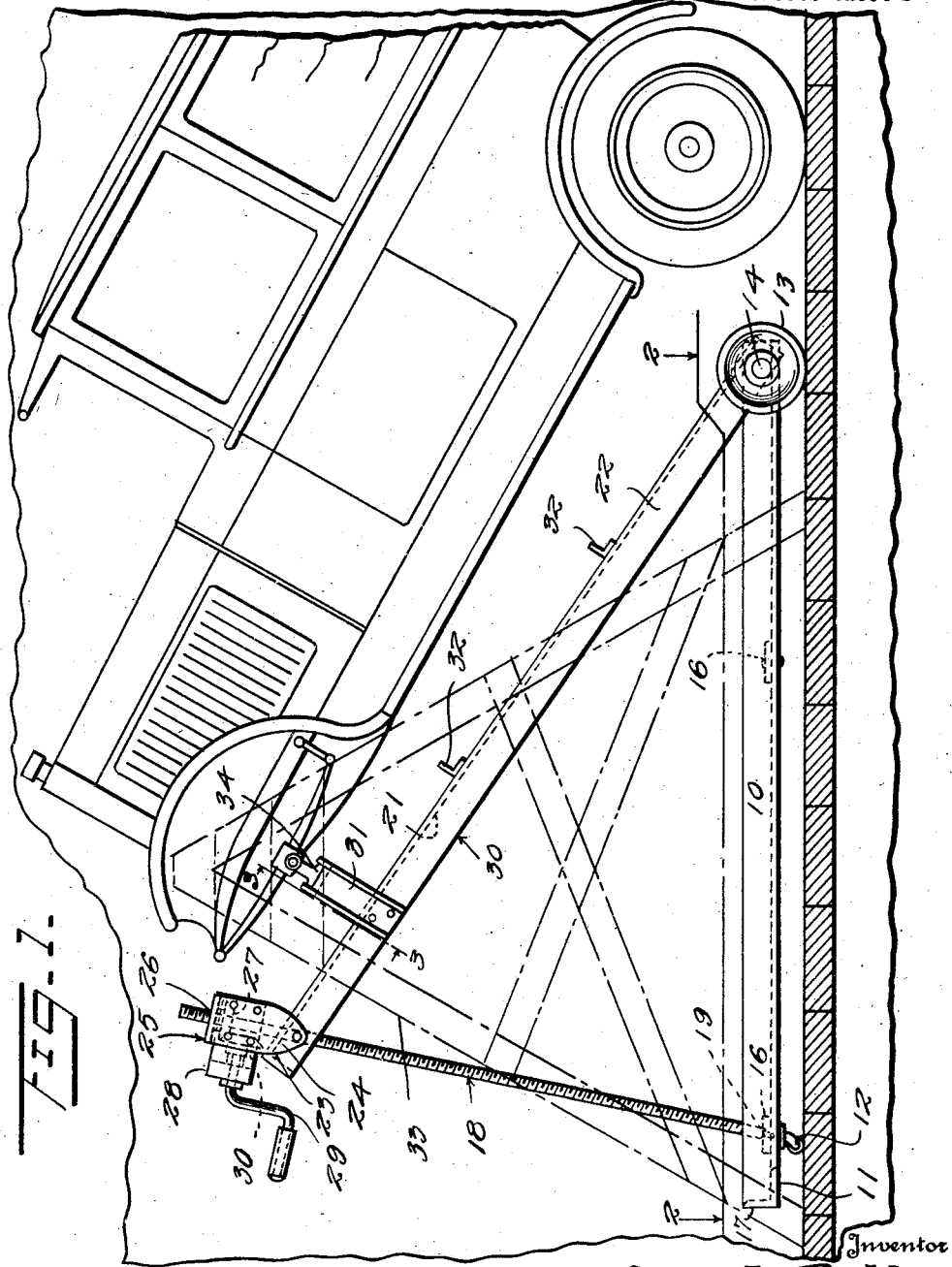

Aug. 23, 1927.
G. L. PITT
1,640,293
AUTOMOBILE JACK
Filed March 11, 1926
2 Sheets-Sheet 2
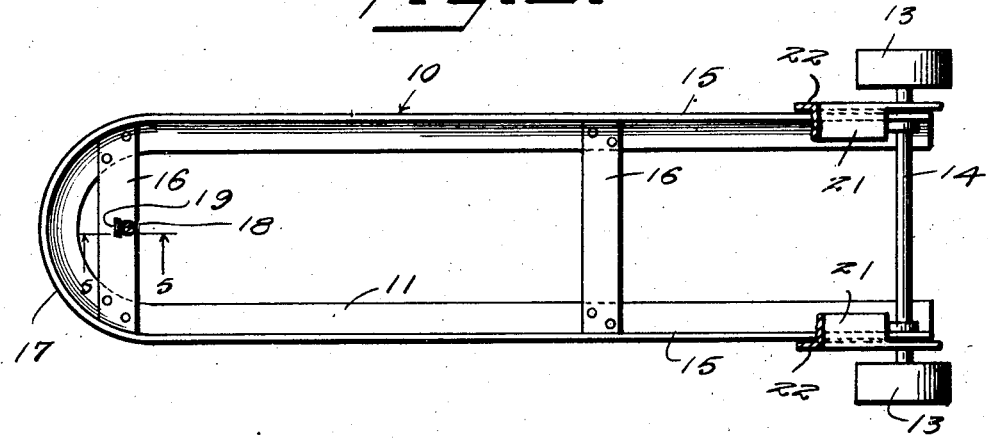
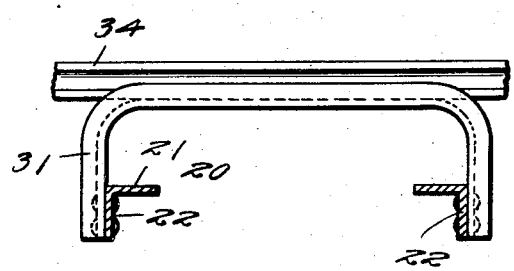
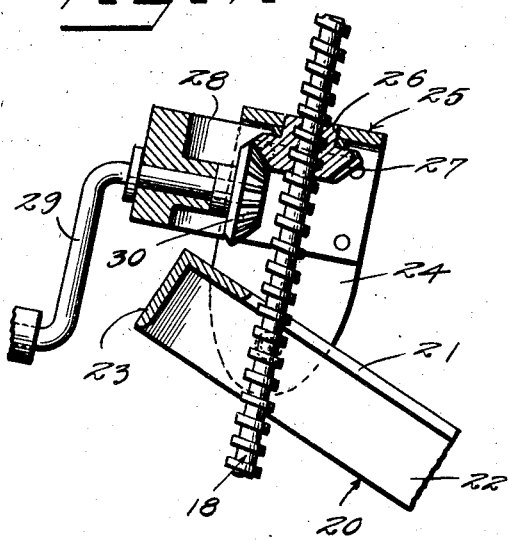
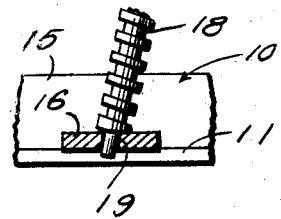
Inventor
Guy L. Pitt
By Watson E. Coleman
Attorney Patented Aug. 23, 1927.

1,640,293

UNITED STATES PATENT OFFICE.

GUY L. PITT, OF ROCKY MOUNT, NORTH CAROLINA.

AUTOMOBILE JACK.

Application filed March 11, 1926. Serial No. 93,962.

This invention relates to automobile jacks and more particularly to a jack for use in unloading automobiles from the car in which they are shipped.

An important object of the invention is to provide a device of this character which may be employed to support the car while the usual A-frames by means of which the forward ends of the cars are usually supported may be removed and which may subsequently be employed to lower the car to a horizontal position.

A further object of the invention is to produce a device of this character which is additionally usable in work in and about the garage wherever one end of the car is to be elevated for any purpose, such as removal of a wheel or the like.

A still further object is to produce a device of this character which may be relatively cheaply constructed, which will be durable and efficient in service and a general improvement in the art.

These and other objects I attain by the construction shown in the accompanying drawings, wherein for the purpose of illustration is shown a preferred embodiment of my invention and wherein:—

Figure 1 is a fragmentary sectional view through a freight car showing a jack constructed in accordance with my invention in use to support the forward end of an automobile preparatory to removing the automobile from a car;

Figure 2 is a section on the line 2—2 of Figure 1;

Figure 3 is a section on the line 3—3 of Figure 1;

Figure 4 is an enlarged detail sectional view taken through the operating mechanism of the jack;

Figure 5 is a section on the line 5—5 of Figure 2.

Referring now more particularly to the drawings, the numeral 10 indicates a frame which is substantially U-shaped and is preferably formed from a single length of angle iron having its horizontally disposed angle 11 inwardly arranged and disposed at the lower side of the frame. This frame is supported at its bight end by casters 12 and at its opposite end by supporting wheels 13 preferably mounted upon an axle 14 connecting the arms 15 of the U. The arms of the frame are connected by suitable braces 16, one of which is arranged adjacent the bight portion 17 of the frame and provides a seat for the lower end of a worm shaft 18. This seat is in the form of a socket 19 elongated transversely of the frame and the end of the shaft 18 is flattened to fit within the socket so that the shaft may rock in a plane longitudinally bisecting the frame but is held against rotation. A supplemental or swinging frame 20 is provided which is likewise U-shaped and formed of angle iron. In this frame, however, the horizontal angle 21 is arranged uppermost and inwardly directed and the frame is of such size that the vertical angle will fit about the vertical angle of the frame 10 when the frame 20 is in its lowermost position. This frame has the ends of its arm 22 pivotally connected to the ends of the arms 15 of the frame 10 preferably by the axle 14, hereinbefore mentioned.

Immediately adjacent its bight portion 23, the frame 20 has pivotally connected to its arms 22, the arms 24 of a U-shaped yoke 25 having at the center of its bight an opening 26 for the passage of the worm 18. Immediately beneath the bight of the yoke 25 and engaging thereagainst is a gear nut 27 for the worm 18 and the arms 24 provide a means for supporting a crank yoke 28 in which is longitudinally mounted a crank 29, the inner end of which is provided with a gear 30 meshing with the gear nut 27. At a point spaced a short distance from the bight 23 of the frame 20, the arms 22 thereof are bridged by an inverted U-shaped support 31 formed of channel iron and having the channel thereof outwardly arranged. To the arms at corresponding points further spaced from the bight 23 are secured angle brackets 32.

In the use of the device for unloading shipping cars, the jack is rolled beneath the automobile, the forward end of which is supported by A-frames 33 and the supplemental or swinging frame 20 adjusted upwardly until the axle 34 of the automobile is supported from the channel bridge 31 and is engaged within the channel thereof. The A-frames are then removed and the automobile may be shifted within the car either with its forward end elevated and supported in this manner or this forward end may first be lowered until the automobile is in substantially horizontal position. It will be noted that the bight portion of the frames is of considerably less width than the normal width of an automobile so that ample clearance is provided to enable application of the front wheels to the axle while the device is still supported from the jack. It will, of course, be obvious that the jack can be employed for ordinary garage use in the usual manner.

Since the construction hereinbefore set forth is capable of a certain range of change and modification without materially departing from the spirit of the invention, I do not limit myself to such specific structure except as hereinafter claimed.

I claim:—

In an automobile jack, a wheel supported main frame, said frame being U-shaped, a second U-shaped frame having the arms thereof pivoted to the arms of the first named frame, a connection between the bights of the frames for shifting the second frame about the pivot thereof, a member bridging the arms of the second frame adjacent the bight portion thereof and having a channel in its upper face adapted to receive the axle of an automobile, a pivotal connection between the arms of the frames comprising an axle directed through the arms of both thereof and upon which certain of the supporting wheels of the first named frame are mounted and a pair of angle iron brackets secured to the arms of said second frame adjacent to but spaced from the bridge member.

In testimony whereof I hereunto affix my signature.

GUY L. PITT.